United States Patent
Yu

(10) Patent No.: US 6,558,175 B1
(45) Date of Patent: May 6, 2003

(54) ELECTRICAL CARD CONNECTOR HAVING ANTI-MISMATING DEVICE

(75) Inventor: Hung-Chi Yu, Hsi-Chih (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/112,972

(22) Filed: Mar. 28, 2002

(30) Foreign Application Priority Data

Dec. 26, 2001 (TW) .......................................... 90222991

(51) Int. Cl.⁷ ............................................ H01R 13/453
(52) U.S. Cl. ...................... 439/138; 439/541.5; 361/737
(58) Field of Search ................... 439/138, 135, 439/677, 541.5; 361/737, 741, 740, 752, 756

(56) References Cited

U.S. PATENT DOCUMENTS 3,823,367 A * 7/1974 Kaye et al. .................. 324/426
5,559,672 A * 9/1996 Buras et al. ................. 361/684
6,269,005 B1 * 7/2001 Tung et al. .................. 361/737
6,305,955 B1 * 10/2001 Billman ...................... 439/138

* cited by examiner

Primary Examiner—Hien Vu
(74) Attorney, Agent, or Firm—Wei Te Chung

(57) ABSTRACT

A stacked electrical card connector (1) includes a PCMCIA card connection member (10) and a smart card connection member (20) stacked with the PCMCIA card connection member for connection with a smart card (40). The PCMCIA card connection member defines an opening (12) for extension of a PCMCIA card (50) to electrically connect with the PCMCIA card connection member. An anti-mismating device (30) is received in the opening of the PCMCIA card connection member. The anti-mismating device includes a pivot portion (33) pivotably attached to the PCMCIA card connection member and a latch portion (34) for blocking the smart card from extending through the opening of the PCMCIA card connection member.

3 Claims, 4 Drawing Sheets

ELECTRICAL CARD CONNECTOR HAVING ANTI-MISMATING DEVICE

BACKGROUND OF THE INVENTION

1. Field of the Invention

The present invention relates to electrical connectors, and particularly to an electrical card connector having an anti-mating device.

2. Prior Art

Electrical connectors are required in electronic devices for ready connection between different electronic devices or components. As one of typical electrical connectors, electrical card connectors are mounted on electronic devices for connection with electrical cards such as PCMCIA cards or smart cards. A conventional electrical card connector defines an opening for extension of an electrical card to mate with terminals of the card connector.

However, a smart card is readily mismated with a conventional PCMCIA card connector. Particularly, when a smart card connector and a PCMCIA card connector are stacked to be mounted on an electronic device, mismating between a smart card and the PCMCAI card connector is ready to happen.

SUMMARY OF THE INVENTION

Accordingly, an object of the present invention is to provide an electrical card connector having an anti-mismating device for preventing unwanted mismating between the electrical card connector and an electrical card.

To achieve the above-mentioned object, a stacked electrical card connector in accordance with the present invention includes a PCMCIA card connection member and a smart card connection member stacked with the PCMCIA card connection member for connection with a smart card. The PCMCIA card connection member defines an opening for extension of a PCMCIA card to electrically connect with the PCMCIA card connection member. An anti-mismating device is received in the opening of the PCMCIA card connection member. The anti-mismating device includes a pivot portion pivotably attached to the PCMCIA card connection member and a latch portion for blocking the smart card from extending through the opening of the PCMCIA card connection member.

Other objects, advantages and novel features of the present invention will be drawn from the following detailed description of a preferred embodiment of the present invention with attached drawings, in which:

DETAILED DESCRIPTION OF THE PREFERRED EMBODIMENTS

Figure 1:
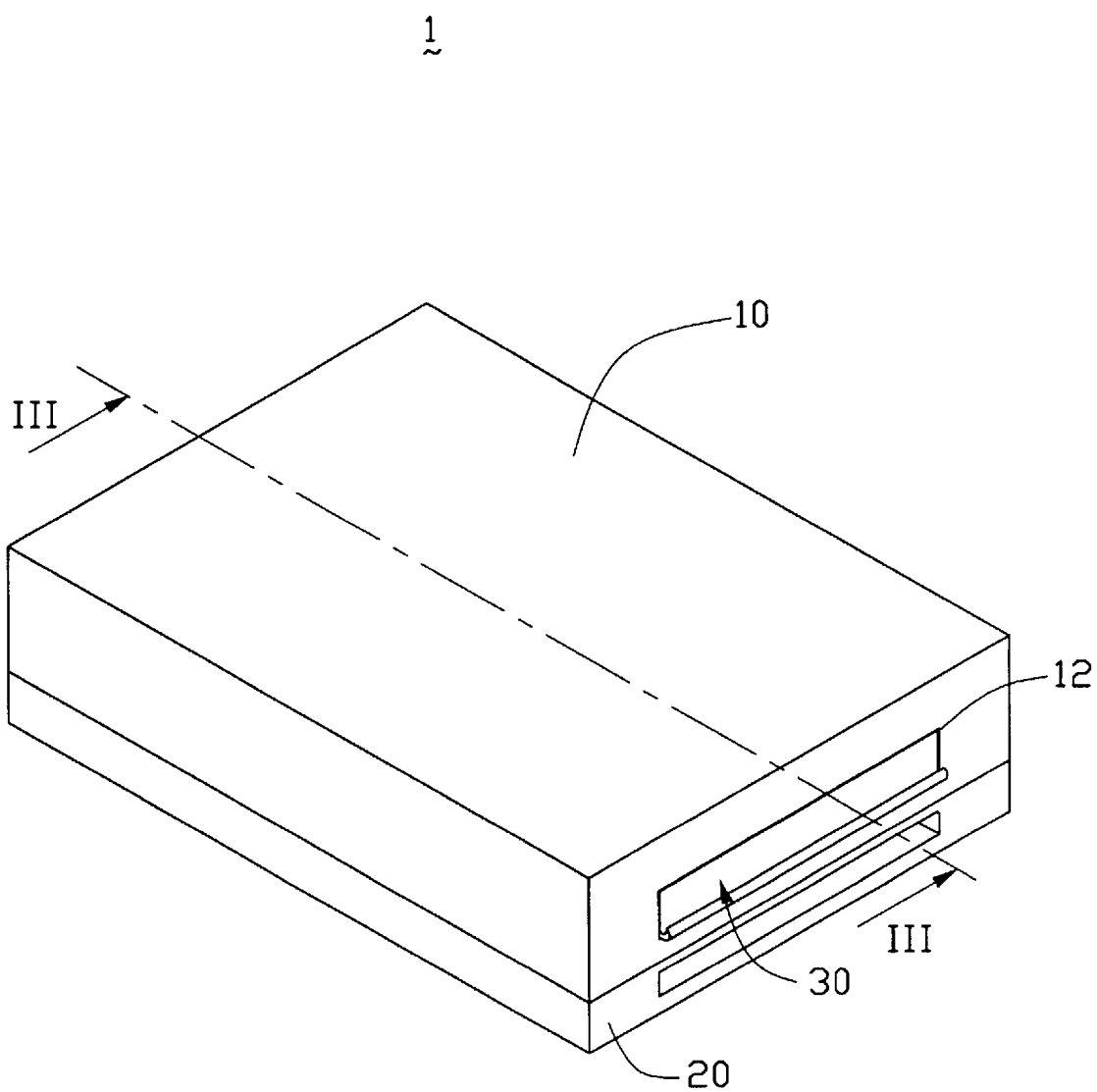
FIG. 1 is a perspective view of a stacked electrical card connector in accordance with the present invention.
Figure 2:
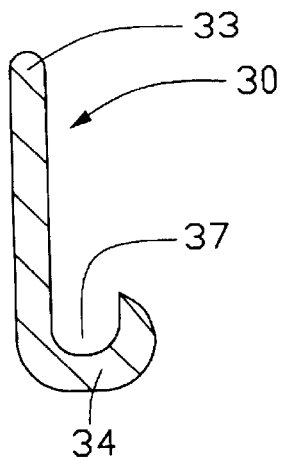
FIG. 2 is a cross-sectional view of an anti-mismating door of FIG. 1.
Figure 3:
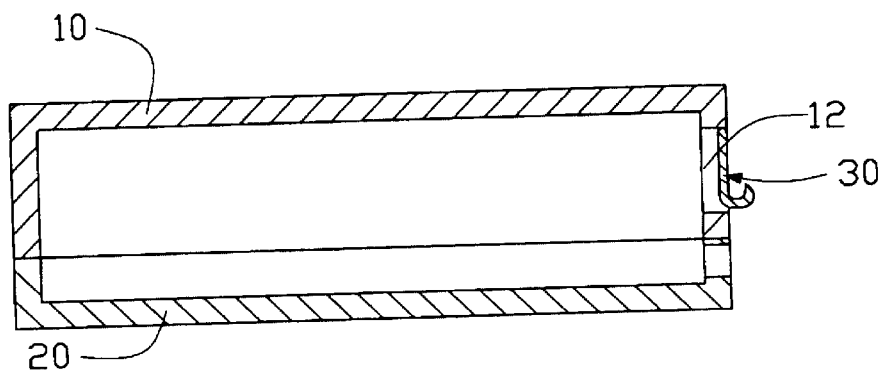
FIG. 3 is a cross-sectional view taken along line III—III of FIG. 1.

Referring to FIGS. 1–3, a stacked electrical card connector 1 in accordance with the present invention includes a PCMCIA card connection member 10 and a smart card connection member 20 under the PCMCIA card connection member 10. The PCMCIA card connection member 10 defines an opening 12 for extension of a PCMCIA card 50 (shown in FIGS. 5A–5B). An anti-mismating door 30 is received in the opening 12 of the PCMCIA card connection member 10. The anti-mismating door 30 includes a pivot portion 33 and a hook-shaped latch portion 34 opposite the pivot portion 33. The pivot portion 33 has two opposite protrusions (not shown) received in opposite recesses (not shown) defined in opposite side walls of the opening 12 of the PCMCIA card connection member 10 thereby pivotably attaching the pivot portion 33 of the anti-mismating door 30 to the PCMCIA card connection member 10. A recess 37 is defined by the latch portion 34.

Figure 4A:
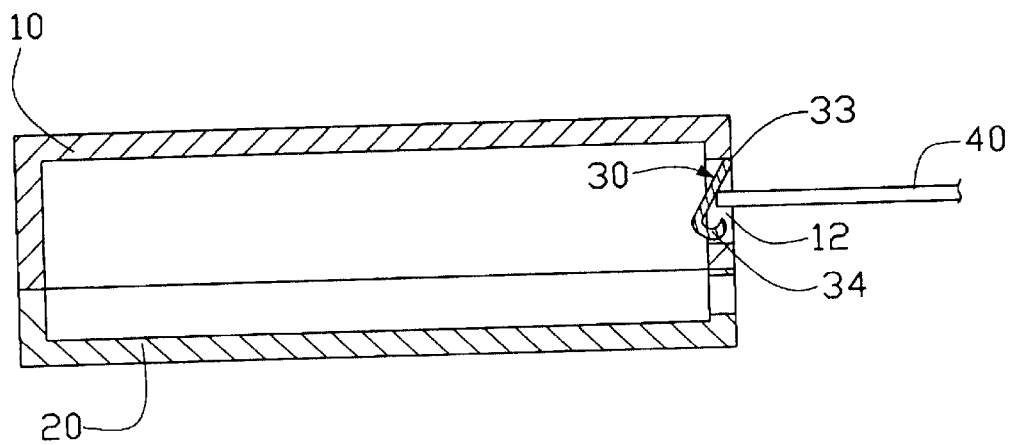
FIGS. 4A–4B are similar to FIG. 3 but showing a smart card inserted to the electrical card connector and blocked by the anti-mismating door.
Figure 4B:
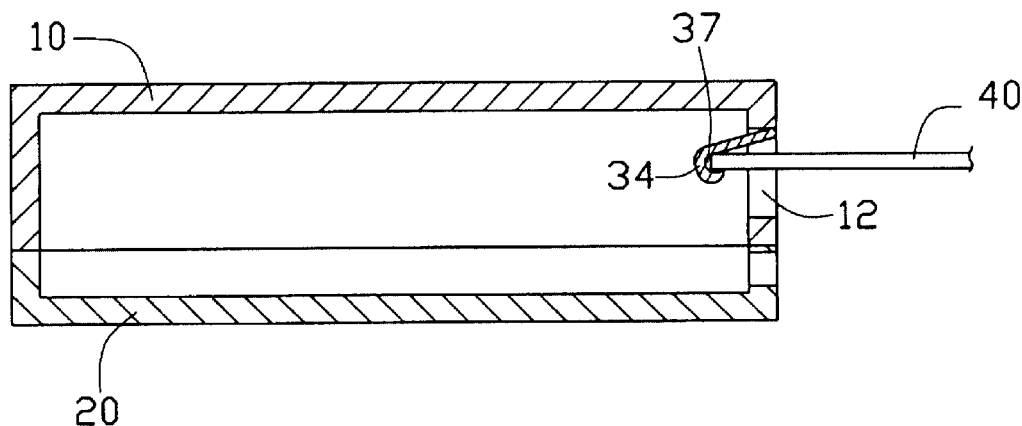

Referring to FIGS. 4A–4B, when a smart card 40 is inserted to the opening 12 of the PCMCIA card connection member 10, the anti-mismating door 30 is actuated to pivot about the pivot portion 33 thereof. The insertion end of the smart card 40 is received in the recess 37 of the anti-mismating door 30, and therefore the smart card 40 is blocked from mating with the PCMCIA card connection member 10. Thus, mismating between the PCMCIA card connection member 10 and a smart card 40 is prevented.

Figure 5A:
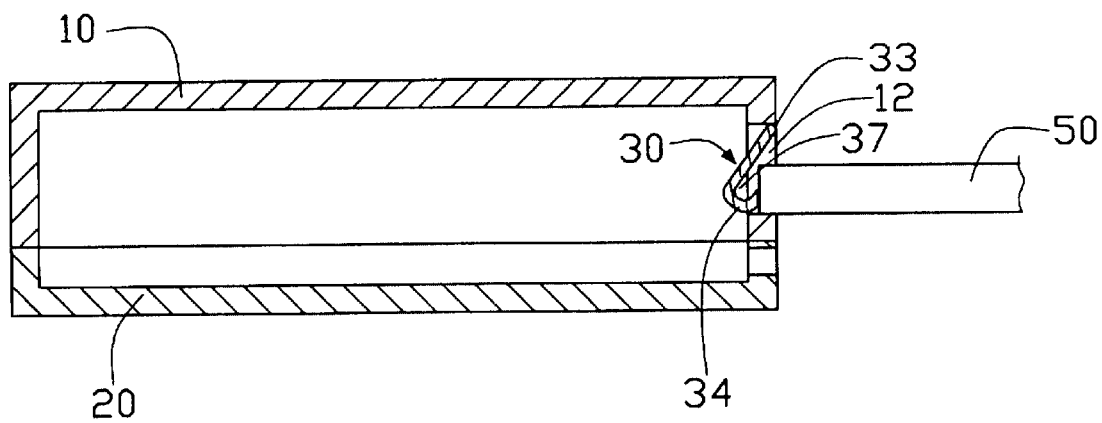
FIGS. 5A–5B are similar to FIG. 3 but showing a PCMCIA card inserted to the electrical card connector and passing through the anti-mismating door.
Figure 5B:
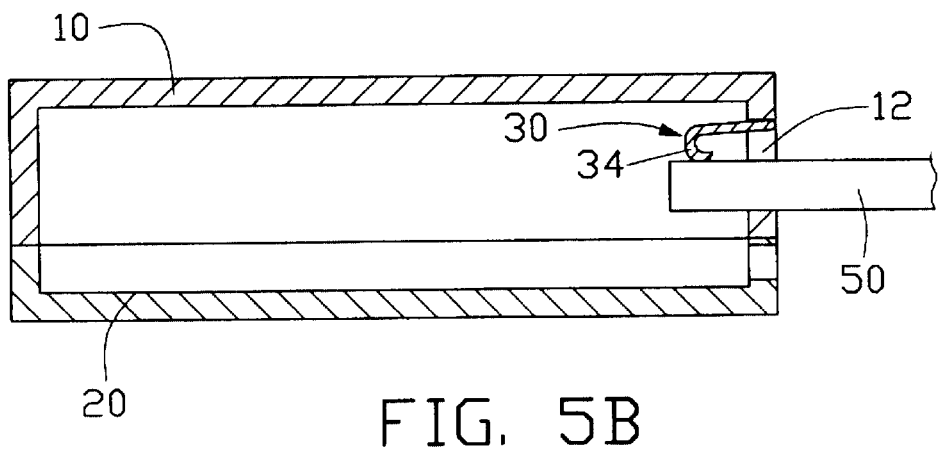

Referring to FIGS. 5A–5B, when the PCMCIA card 50 is inserted to the opening 12 of the PCMCIA card connection member 10, the anti-mismating door 30 is actuated to pivot about the pivot portion 33 thereof. The latch portion 34 of the anti-mismating door 30 abuts against a top surface of the PCMCIA card 50. The PCMCIA card 50 is allowable to connect with the PCMCIA card connection member 10.

Figure 6:
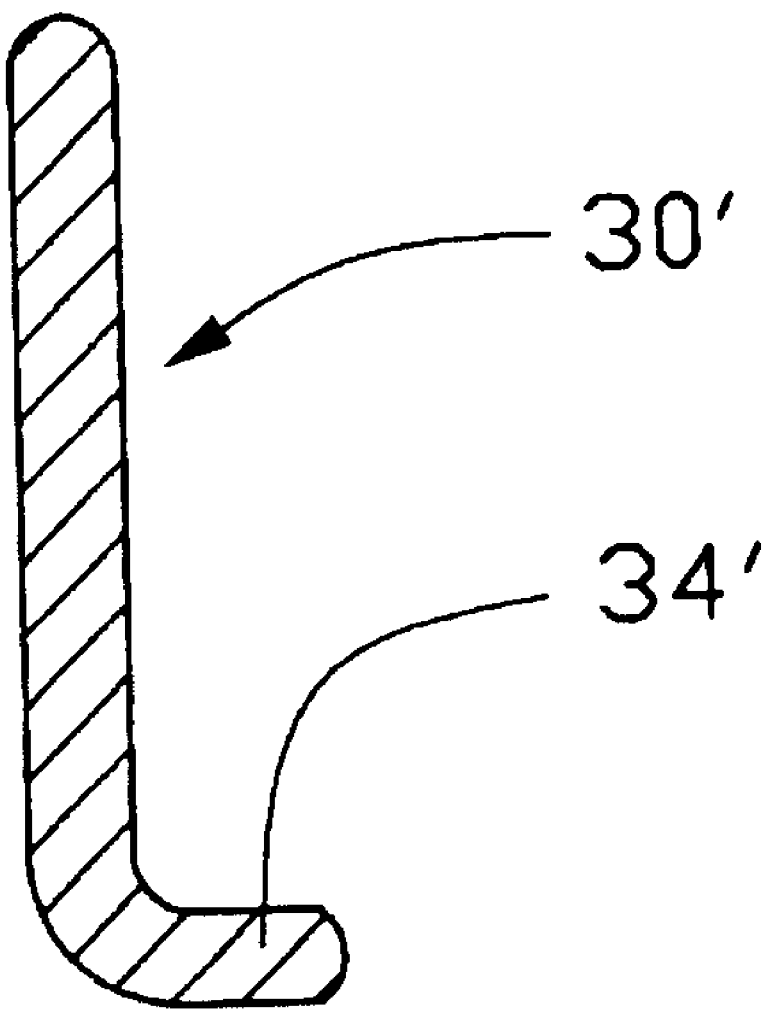
FIG. 6 is a cross-sectional view of an anti-mismating door of a stacked electrical card connector in accordance with an alternative embodiments of the present invention.

Referring to FIG. 6, an anti-mismating door 30' in accordance with an alternative embodiment of the present invention is shown. The anti-mismating door 30' has an L-shaped latch portion 34' having a blocking bar (not labeled) perpendicular to the door 30'. The insertion end of a smart card 40 is blocked by the blocking bar of the latch portion 34' and therefore the smart card 40 is blocked from mating with the PCMCIA card connection member 10.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. An electrical card connector comprising:
    an electrical card connection member defining an opening for insertion of a desired electrical card to electrically connect with the electrical card connection member; and
    an anti-mismating device received in the opening of the electrical card connection member, the anti-mismating device comprising a pivot portion pivotably attached to the electrical card connection member and a latch portion for blocking an unwanted electrical card from extending through the opening of the electrical card connection member; wherein
        the latch portion of the anti-mismating device is opposite the pivot portion; wherein
        the latch portion of the anti-mismating device abuts against a top surface of the desired electrical card when the desired electrical card is inserted into the opening of the electrical card connection member; wherein the latch portion of the anti-mismating device is substantially hook-shaped and therefore defines a recess, and wherein an insertion end of the unwanted electrical card is received in the recess of the ant-mismating device and therefore the unwanted electrical card is blocked from mating with the electrical card connection member; wherein the pivot portion of the anti-mismating device has two opposite protrusions received in opposite recesses defined in opposite side walls of the opening of the electrical card connection member thereby pivotably attaching the pivot portion of the anti-mismating device to the electrical card connection member.

2. A stacked electrical card connector comprising:

a first card connection member defining an opening for insertion of a first card to electrically connect with the first card connection member;

a second card connection member stacked with the first card connection member for connection with a second card which is thinner than the first card; and an anti-mismating device received in the opening of Fe first card connection member for blocking the second card from extending through the opening of the first card connection member; wherein the anti-mismating device comprises a pivot portion pivotably attached to the first card connection member and a latch portion for blocking a second card from extending through the opening of the first card connection member; wherein the latch portion of the anti-mismating device is opposite the pivot portion; wherein the latch portion of the anti-mismating device abuts against a top surface of the first card when the first card is inserted into the opening of the first card connection member; wherein the latch portion of the anti-mismating device is substantially hook-shaped and therefore defines a recess, and wherein an insertion end of the second card is received in the recess of the anti-mismating device and therefore the second card is blocked from mating with the first card connection member; wherein the pivot portion of the anti-mismating device has two opposite protrusions received in opposite recesses defined in opposite side walls of the opening of the first card connection member thereby pivotably attaching the pivot portion of the anti-mismating device to the first card connection member.

3. The stacked electrical card connector as claimed in claim 2, wherein the first card is a PCMCIA card and the second card is a smart card.

* * * * *